United States Patent
Luo et al.

(10) Patent No.: US 10,199,829 B2
(45) Date of Patent: Feb. 5, 2019

(54) MICROGRID SYSTEM AND CONTROL METHOD FOR THE SAME

(71) Applicant: NEC Corporation, Tokyo (JP)

(72) Inventors: Yuan Luo, Tokyo (JP); Shin Nakamura, Tokyo (JP); Satoko Itaya, Tokyo (JP); Kenichi Maruhashi, Tokyo (JP)

(73) Assignee: NEC CORPORATION, Tokyo (JP)

(*) Notice: Subject to any disclaimer, the term of this patent is extended or adjusted under 35 U.S.C. 154(b) by 209 days.

(21) Appl. No.: 15/121,485

(22) PCT Filed: Jan. 9, 2015

(86) PCT No.: PCT/JP2015/050440
§ 371 (c)(1),
(2) Date: Aug. 25, 2016

(87) PCT Pub. No.: WO2015/129301
PCT Pub. Date: Sep. 3, 2015

(65) Prior Publication Data
US 2016/0359327 A1 Dec. 8, 2016

(30) Foreign Application Priority Data
Feb. 26, 2014 (JP) ................. 2014-035061

(51) Int. Cl.
*H02J 1/10* (2006.01)
*H02J 3/28* (2006.01)
(Continued)

(52) U.S. Cl.
CPC ....... *H02J 3/28* (2013.01); *H02J 1/10* (2013.01); *H02J 3/32* (2013.01); *H02J 3/382* (2013.01);
(Continued)

(58) Field of Classification Search
CPC ...... H02J 3/32; H02J 7/0068; H02J 1/10; H02J 7/0047; H02J 2007/005; Y02P 80/11
See application file for complete search history.

(56) References Cited

U.S. PATENT DOCUMENTS

| | | | |
|---|---|---|---|
| 2012/0150679 A1* | 6/2012 | Lazaris | G06Q 30/0605 705/26.2 |
| 2013/0328397 A1* | 12/2013 | Lee | H02J 3/32 307/23 |
| 2015/0188482 A1* | 7/2015 | Berkowitz | H02J 3/383 320/101 |

FOREIGN PATENT DOCUMENTS

| | | |
|---|---|---|
| JP | 2003-244854 A | 8/2003 |
| JP | 2012-055087 A | 3/2012 |

(Continued)

OTHER PUBLICATIONS

International Search Report corresponding to PCT/JP2015/050440, dated Apr. 7, 2015 (5 pages).
Written Opinion corresponding to PCT/JP2015/050440, dated Apr. 7, 2015 (9 pages).

*Primary Examiner* — Jared Fureman
*Assistant Examiner* — Duc M Pham
(74) *Attorney, Agent, or Firm* — Wilmer Cutler Pickering Hale and Dorr LLP

(57) ABSTRACT

This microgrid system (100) includes: a generator device (111) for outputting power; a plurality of sub-microgrids (110) that include utility customers (112) who consume power; a shared unit (120) connected to the plurality of sub-microgrids (110), and provided with a plurality of energy storage devices (121) for storing power; and a control device (130) that, when power outputted by the generator device (111) is to be stored in the energy storage devices (121), selects an energy storage device (121) as the storage destination for the power outputted by the generator device (Continued)

(111), in accordance with the respective status of the plurality of energy storage devices (121), and when power is to be supplied to utility customers (112), selects an energy storage device (121) as the supply source for supplying power to the utility customers (112), in accordance with the respective status of the plurality of energy storage devices (121).

14 Claims, 11 Drawing Sheets

(51) Int. Cl.
    *H02J 3/32*     (2006.01)
    *H02J 7/00*     (2006.01)
    *H02J 3/38*     (2006.01)
    *H02J 3/46*     (2006.01)

(52) U.S. Cl.
    CPC .............. *H02J 3/46* (2013.01); *H02J 7/0047* (2013.01); *H02J 7/0068* (2013.01); *H02J 2007/005* (2013.01); *Y02P 80/11* (2015.11)

(56) References Cited

FOREIGN PATENT DOCUMENTS

| | | |
|---|---|---|
| JP | 2012-060761 A | 3/2012 |
| JP | 2013-063000 A | 4/2013 |
| JP | 2013-110799 A | 6/2013 |
| JP | 2013-219908 A | 10/2013 |
| JP | 2014-023377 A | 2/2014 |

\* cited by examiner

MICROGRID SYSTEM AND CONTROL METHOD FOR THE SAME

CROSS-REFERENCE TO RELATED APPLICATIONS

This application is a national stage application of International Application No. PCT/JP2015/050440 entitled "Microgrid System and Control Method For The Same," filed on Jan. 9, 2015, which claims the benefit of the priority of Japanese Patent Application No. 2014-035061, filed on Feb. 26, 2014, the disclosures of each of which are hereby incorporated by reference in their entirety.

TECHNICAL FIELD

The present invention relates to a microgrid system and a control method for the microgrid system.

BACKGROUND ART

In recent years, small-scale utility grid systems called microgrid systems have been gathering attention. In a microgrid system, generator devices, which are energy resources, and customers (such as factories, schools, houses, and shops), who consume power, are connected to each other by a utility grid, which is different from any commercial utility grid.

A microgrid system controls power supply according to demand so as to make maximum use of the resources in the system, thereby attempting to provide stable and inexpensive power supply. For example, power consumed by the customers in a system is supplied as much as possible by the power generators in the system, and only insufficient power is bought from an ordinary commercial utility grid, whereby stable and inexpensive power supply is made possible.

Examples of power generators often employed in microgrid systems are those using renewable energy, such as sunlight, wind power, and biomass energy. Power supply from such a power generator is unstable in some cases.

To address this, PTL1 (Japanese Laid-open Patent No. 2012-055087) discloses a technique for controlling distribution of power from power supply sources to power consumption sources in a predetermined area on the basis of information such as environmental variation in power consumption by each of the power consumption sources and power supply by each of the power supply sources. With this technique, it is possible to provide stable power supply by controlling distribution of power from the power supply sources to the power consumption sources on the basis of information such as environmental variation.

Further, PTL2 (Japanese Laid-open Patent No. 2013-110799) discloses a technique for providing an energy storage device, such as a storage battery, in a microgrid system. This technique attempts stable power supply by storing, in the storage battery, power output by a power generator (solar panel) in the microgrid system, and supplying the power stored in the storage battery to customers as needed.

CITATION LIST

Patent Literature

[PTL1] Japanese Laid-open Patent No. 2012-055087
[PTL2] Japanese Laid-open Patent No. 2013-110799

SUMMARY OF INVENTION

Technical Problem

As described above, power generators using renewable energy are often used in microgrid systems. Depending on the environment, this leads, in some cases, to a situation where power supply from a power supply source exceeds power consumption by power consumption sources, consequently producing excess power.

In the technique disclosed in PTL1, a process to be performed when excess power is produced is not sufficiently taken into account, and therefore power output by the power supply sources is sometimes wasted.

In the technique disclosed in PTL2, when excess power is generated, the excess power is stored in the energy storage device, thereby preventing power from being wasted.

FIG. 1 is a graph illustrating charge and discharge characteristics of a typical storage battery. FIG. 1 illustrates charge and discharge characteristics of a case in which the storage battery discharges only in the period from an initial time point (t0) to a time point t1 and is then charged. FIG. 2 is a graph illustrating a relationship between a state of charge (SOC) and output voltage of the storage battery.

As illustrated in FIG. 1, the output voltage of the storage battery gradually decreases from an initial voltage (4.2 V) after the start of the discharge and decreases abruptly when reaching a predetermined voltage (3.4 V in FIG. 1). Moreover, as illustrated in FIG. 2, in a state where the output voltage of the storage battery is equal to or lower than the predetermined voltage (3.4 V), the SOC is equal to or lower than 20%. To increase the life of a storage battery, it is normally desirable to stop discharge of the storage battery and to charge the storage battery, when the SOC decreases to 20% or lower.

According to the technique disclosed in PTL2, a power generator and an energy storage device are provided in a one-to-one relationship in the microgrid system, the energy storage device storing power output from the power generator. Due to this configuration, it is difficult for the technique disclosed in PTL2 to enable stable power supply when the SOC of the storage battery in the energy storage device decreases and consequently fluctuation of output voltage increases or power supply is stopped to charge the storage battery. Further, it is not possible to store excess power of the power generator after completion of charge of the storage battery, consequently wasting power output from the power generator in some cases.

It is also conceivable to configure a storage battery with a storage capacity large enough to store sufficient power for power consumption by the customers in a microgrid system. However, the cost of a storage battery is typically not proportional to the storage capacity of the storage battery, and the cost per unit storage capacity increases as the storage capacity increases. Accordingly, using a storage battery having a large storage capacity as described above leads to an increase in cost.

It is an object of the present invention to provide a microgrid system capable of limiting an increase in cost, reducing waste of power, and achieving stable power supply, and a method of controlling the microgrid system.

Solution to Problem

To achieve the above-mentioned object, a microgrid system according to the present invention includes: a plurality of sub-microgrids each of which comprises a power generator that outputs power and a customer that consumes power; a shared unit that is connected to each of the plurality of sub-microgrids and that includes a plurality of energy storage devices for storing power; and a control device that determines, when power output by any of the power generators is to be stored in the energy storage devices, an energy storage device to serve as a storage of the power output by the power generator, according to states of the plurality of respective energy storage devices, and that determines, when power is to be supplied to any of the customers, an energy storage device to serve as a supplier of the power to the customer, according to states of the plurality of respective energy storage devices.

To achieve the above-mentioned object, a method of controlling a microgrid system is a control method of microgrid system having a power generator that outputs power, wherein the microgrid system is provided with a plurality of sub-microgrids each of which includes a power generator that outputs power and a customer that consumes power, and a shared unit that is connected to each of the plurality of sub-microgrids and that includes a plurality of energy storage devices for storing power, the method determines, when power output by any of the power generators is to be stored, an energy storage device to serve as a storage of the power output by the power generator, according to states of the plurality of respective energy storage devices; and determines, when power is to be supplied to any of the customers, an energy storage device to serve as a supplier of the power to the customer, according to states of the plurality of respective energy storage devices.

Advantageous Effect of Invention

According to the present invention, it is possible to limit an increase in cost, to reduce waste of power, and to provide stable power supply.

DESCRIPTION OF EMBODIMENTS

Exemplary embodiments for carrying out the present invention are described below with reference to the drawings.

First Exemplary Embodiment

Figure 1:
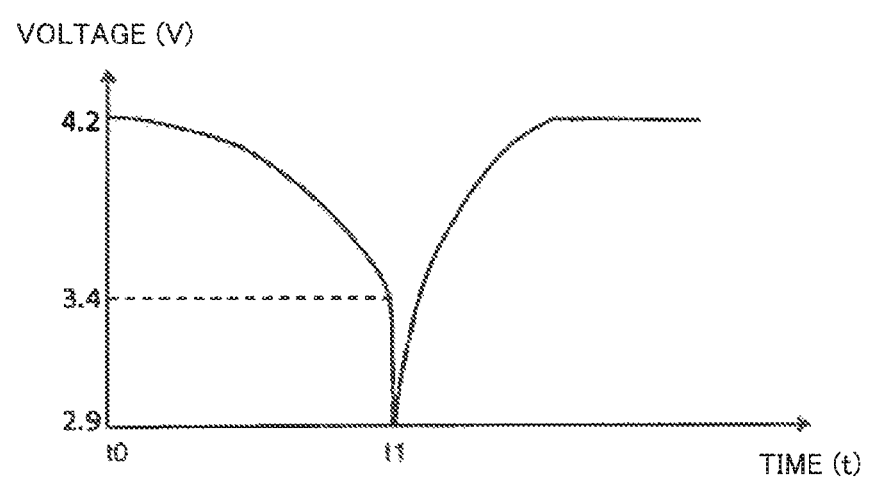
FIG. 1 is a graph illustrating charge and discharge characteristics of a typical storage battery.
Figure 2:
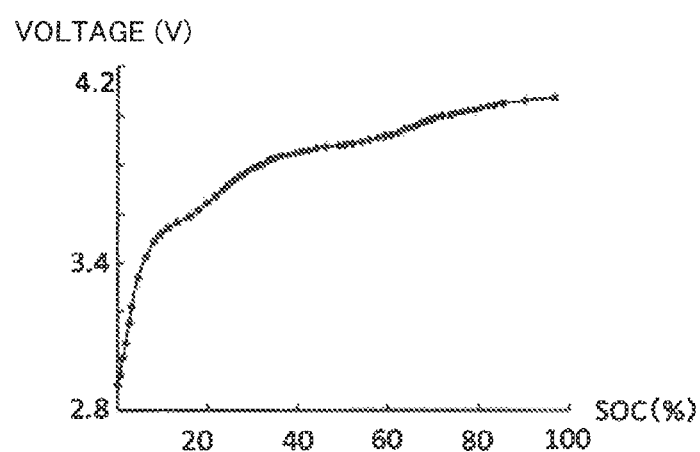
FIG. 2 is a graph illustrating a relationship between a state of charge and output voltage of the typical storage battery.
Figure 3:
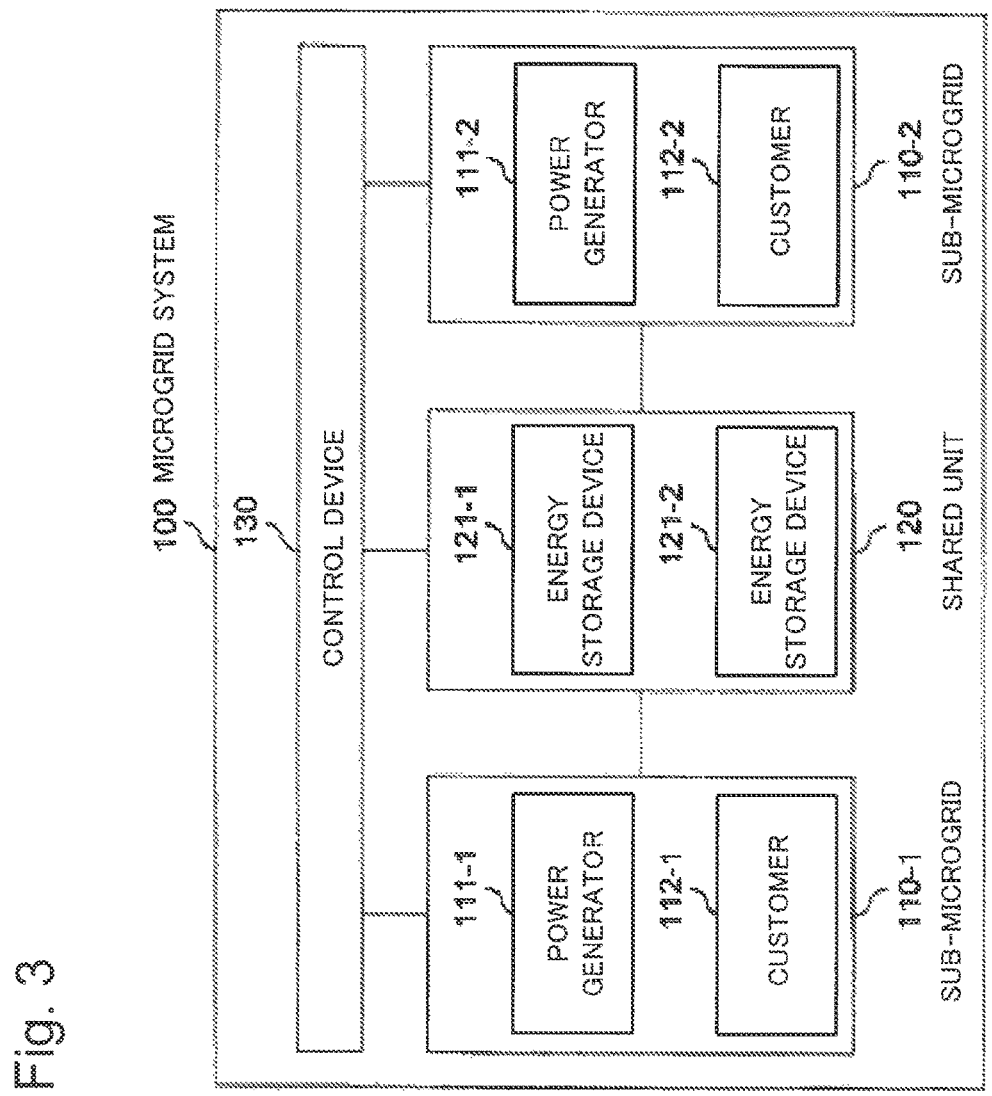
FIG. 3 is a diagram illustrating a configuration of main part of a microgrid system of a first exemplary embodiment of the present invention.

FIG. 3 is a diagram illustrating a configuration of main part of a microgrid system 100 of a first exemplary embodiment of the present invention.

The microgrid system 100 illustrated in FIG. 3 includes sub-microgrids 110 (110-1 and 110-2), a shared unit 120, and a control device 130.

The sub-microgrid 110-1 includes a power generator 111-1 and a customer 112-1.

The sub-microgrid 110-2 includes a power generator 111-2 and a customer 112-2.

The shared unit 120 is connected to each of the sub-microgrids 110-1 and 110-2, and includes a plurality of energy storage devices 121 (121-1 and 121-2).

The power generators 111-1 and 111-2 output power.

The energy storage devices 121-1 and 121-2 store power.

The customers 112 consume power.

The control device 130 controls the power generators 111 and the energy storage devices 121-1 and 121-2.

Next, operation of the microgrid system 100 is described.

In a case of storing power output by one of the power generators 111 in the energy storage devices 121, the control device 130 determines the energy storage device 121 to serve as the storage for storing the power output by the power generator 111, according to the states of the respective energy storage devices 121-1 and 121-2. Further, in a case of supplying power to one of the customers 112, the control device 130 determines the energy storage device to serve as a supplier for supplying the power to the customer 112, according to the states of the respective energy storage devices 121-1 and 121-2.

As described above, the microgrid system 100 of this exemplary embodiment includes the control device 130 that determines the energy storage device to serve as a storage of power output by each of the power generators 111 and the energy storage device to serve as a supplier of power to each of the customers 112, according to the states of the energy storage devices 121-1 and 121-2.

By determining the energy device to serve as a storage of power output by each of the power generators 111, according to the states of the energy storage devices 121-1 and 121-2, it is possible to store the power in the energy device with enough capacity to store the power and to hence possibly reduce waste of power.

Further, by determining the energy storage device 121 to serve as a supplier of power to each of the customers 112, according to the states of the energy storage devices 121-1 and 121-2, it is possible to prevent a situation where any of the energy storage devices 121 in a low SOC supplies power to the customer 112. Thus, stable power supply to the customers 112 is enabled. In addition, it is possible to prevent a situation where any of the energy storage devices 121 in a low SOC continues to supply power, and to hence possibly increase the life of each of the energy storage devices 121.

Further, by providing the plurality of energy storage devices 121, it is possible to reduce the cost per unit storage capacity and to hence limit an increase in cost, in comparison with a case of providing a single energy storage device having a large storage capacity.

Second Exemplary Embodiment

Figure 4:
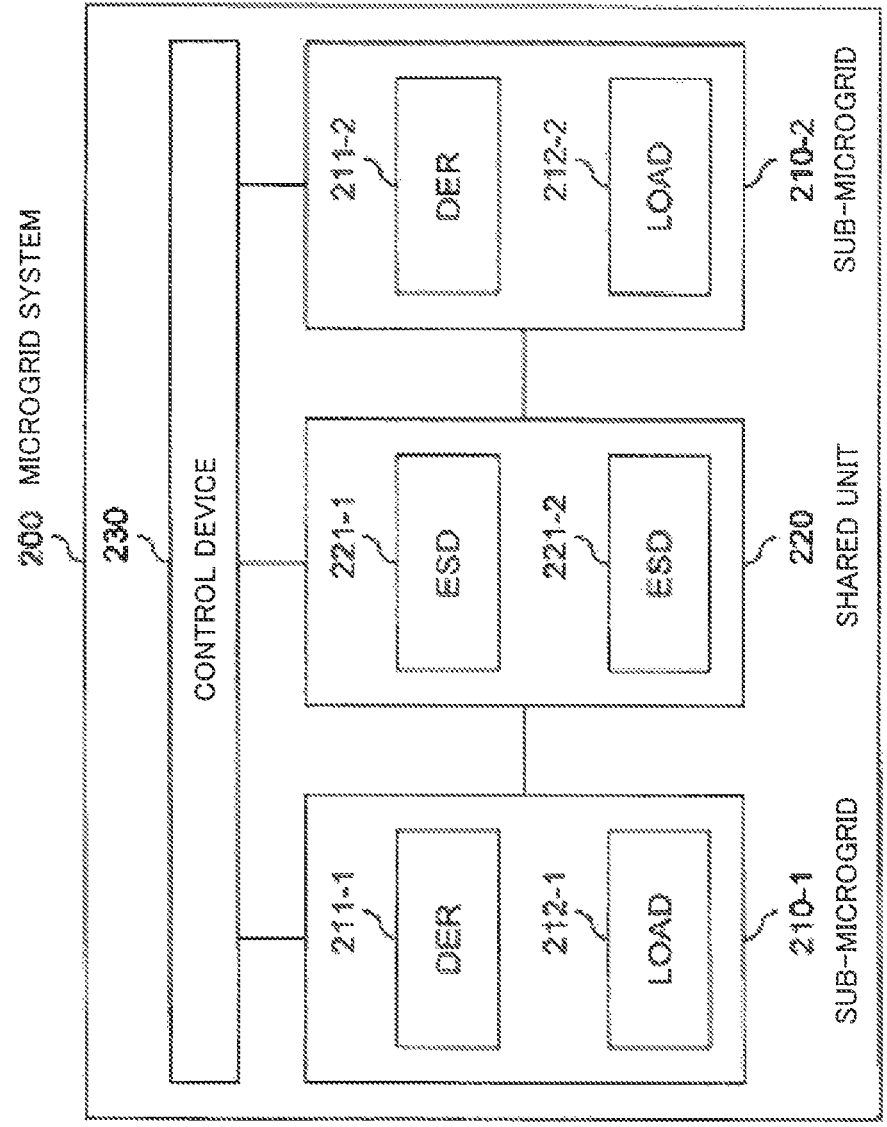
FIG. 4 is a diagram illustrating a configuration of main part of a microgrid system of a second exemplary embodiment of the present invention.

FIG. 4 is a diagram illustrating a configuration of main part of a microgrid system 200 of a second exemplary embodiment of the present invention.

The microgrid system 200 illustrated in FIG. 4 includes sub-microgrids 210 (210-1 and 210-2), a shared unit 220, and a control device 230.

The sub-microgrid 210-1 includes a distributed energy resource (DER) 211-1 and a customer (LOAD) 212-1.

The sub-microgrid 210-2 includes a DER 211-2 and a LOAD 212-2.

The shared unit 220 is connected to each of the sub-microgrids 210-1 and 210-2, and includes a plurality of energy storage devices (ESDs) 221 (221-1 and 221-2).

The DERs 211-1 and 211-2 are power generators that convert renewable energy, e.g., sunlight, wind power, or biomass energy, to power and output the power.

The ESDs 221-1 and 221-2 are energy storage devices that store power output by the DERs 211-1 and 211-2.

As described above, in the microgrid system 200, the shared unit 220 includes the same number of ESDs 221 as that of the sub-microgrids 210. In other words, in the microgrid system 200, the ESDs 221 are provided so as to correspond to the respective sub-microgrids 210. It is assumed below that the ESD 221-1 is provided so as to correspond to the sub-microgrid 210-1 (the DER 211-1 and the LOAD 212-1). It is also assumed that the ESD 221-2 is provided so as to correspond to the sub-microgrid 210-2 (the DER 211-2 and the LOAD 212-2).

The LOAD 212-1 consumes power output by the DER 211-1 or power stored in the ESD 221-1 or 221-2.

The LOAD 212-2 consumes power output by the DER 211-2 or power stored in the ESD 221-1 or 221-2.

The control device 230 controls the DERs 211 and the ESDs 221.

Next, operation of the microgrid system 200 is described.

Figure 5:
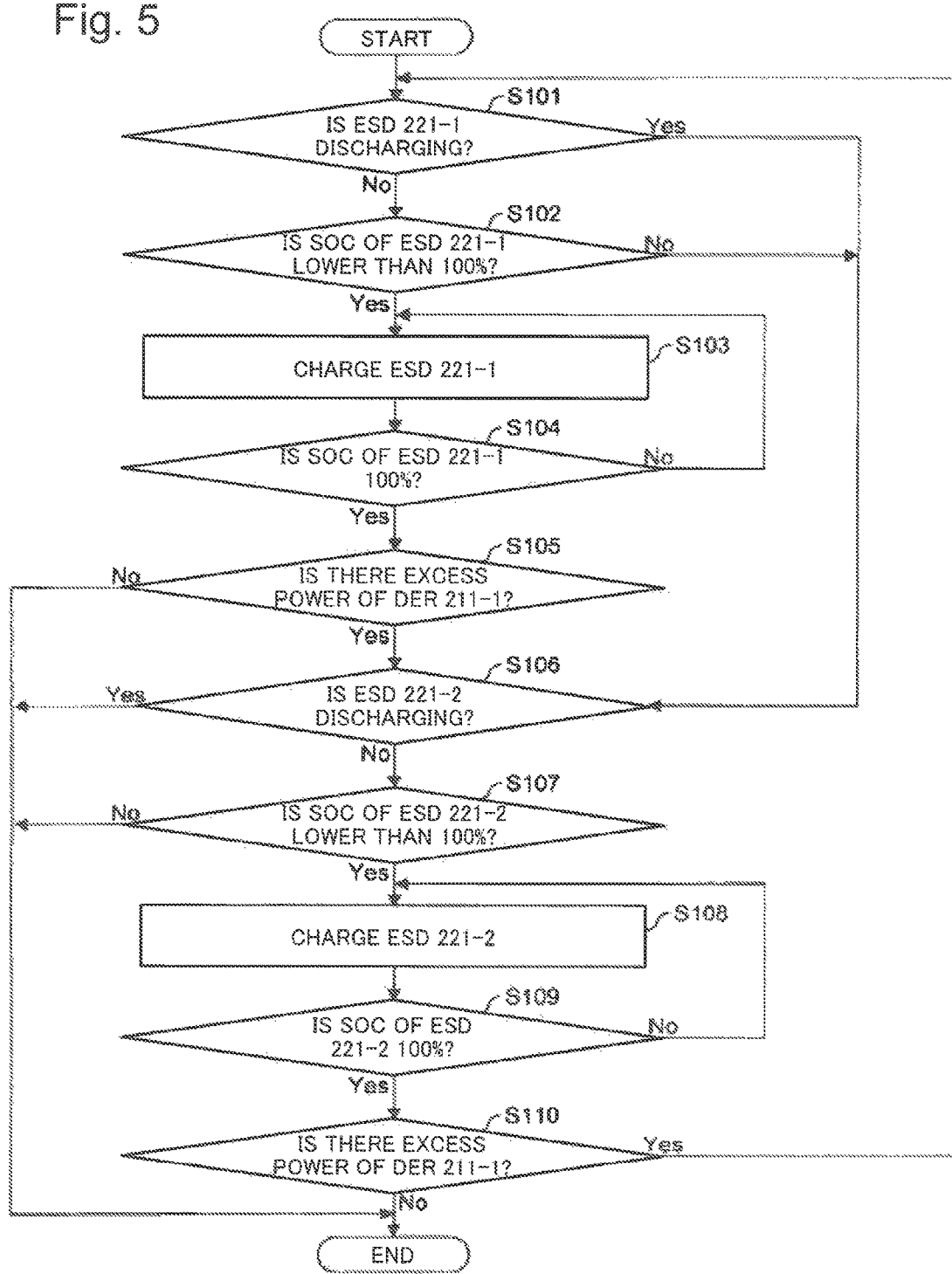
FIG. 5 is a flowchart presenting operations of the microgrid system illustrated in FIG. 4 performed to store excess power of a DER 211-1 in an ESD.

First, operation performed when excess power of the DER 211-1 is to be stored in the ESDs 221 is described with reference to the flowchart presented in FIG. 5.

The control device 230 monitors the state of power supply and demand in the system and causes, when determining that there is excess power in an output by the DER 211-1, the ESDs 221 to store the excess power.

First, the control device 230 determines whether or not the ESD 221-1 corresponding to the DER 211-1 is discharging (Step S101).

When determining that the ESD 221-1 is not discharging (Step S101: No), the control device 230 determines whether or not the SOC indicating the charge level of the ESD 221-1 is lower than 100% (Step S102).

When determining that the SOC of the ESD 221-1 is lower than 100% (Step S102: Yes), the control device 230 causes the ESD 221-1 to store the excess power of the DER 211-1 (i.e., charges the ESD 221-1) (Step S103).

Subsequently, the control device 230 determines whether or not the SOC of the ESD 221-1 is 100% after, for example, a predetermined time period has elapsed (Step S104).

When determining that the SOC of the ESD 221-1 is not 100% (Step S104: No), the control device 230 returns to the operation in Step S103.

When determining that the SOC of the ESD 221-1 is 100% (Step S104: Yes), the control device 230 determines that the charging of the ESD 221-1 is completed and determines whether or not there is (still remains) excess power of the DER 211-1 (Step S105).

When determining that there is no excess power of the DER 211-1 (Step S105: No), the control device 230 terminates the process.

When determining that there is excess power of the DER 211-1 (Step S105: Yes), the control device 230 determines whether or not the ESD 221-2 is discharging (Step S106).

When determining that the ESD 221-2 is discharging (Step S106: Yes), the control device 230 terminates the process.

When determining that the ESD 221-2 is not discharging (Step S106: No), the control device 230 determines whether or not the SOC of the ESD 221-2 is lower than 100% (Step S107).

When determining that the SOC of the ESD 221-2 is not lower than 100%, i.e., determining that the SOC of the ESD 221-2 is 100% (Step S107: No), the control device 230 terminates the process.

When determining that the SOC of the ESD 221-2 is lower than 100% (Step S107: Yes), the control device 230 causes the ESD 221-2 to store the excess power of the DER 211-1 (i.e., charges the ESD 221-2) (Step S108).

Subsequently, the control device 230 determines whether or not the SOC of the ESD 221-2 is 100% after, for example, a predetermined time period has elapsed (Step S109).

When determining that the SOC of the ESD 221-2 is not 100% (Step S109: No), the control device 230 returns to the operation in Step S108.

When determining that the SOC of the ESD 221-2 is 100% (Step S109: Yes), the control device 230 determines that the charging of the ESD 221-2 is completed and determines whether or not there is (still remains) excess power of the DER 211-1 (Step S110).

When determining that there is no excess power of the DER 211-1 (Step S110: No), the control device 230 terminates the process.

When determining that there is excess power of the DER 211-1 (Step S110: Yes), the control device 230 returns to the operation in Step S101.

When determining that the ESD 221-1 is discharging (Step S101: Yes), the control device 230 advances to the operation in Step S106. When determining that the SOC of the ESD 221-1 is not lower than 100%, i.e., the SOC of the ESD 221-1 is 100% (Step S102: No), the control device 230 advances to the operation in Step S106.

As described above, when excess power of the DER 211-1 is to be stored in the ESDs 221, the control device 230 preferentially charges the ESD 221-1, which corresponds to the DER 211-1. The control device 230 charges the other ESD 221 when the ESD 221-1 is discharging, when the SOC of the ESD 221-1 is 100%, or when there is still excess power of the DER 211-1 after completion of charging of the ESD 221-1.

With this configuration, it is possible to store excess power of the DER 211-1 in the ESDs 221 without wasting the excess power.

Figure 6:
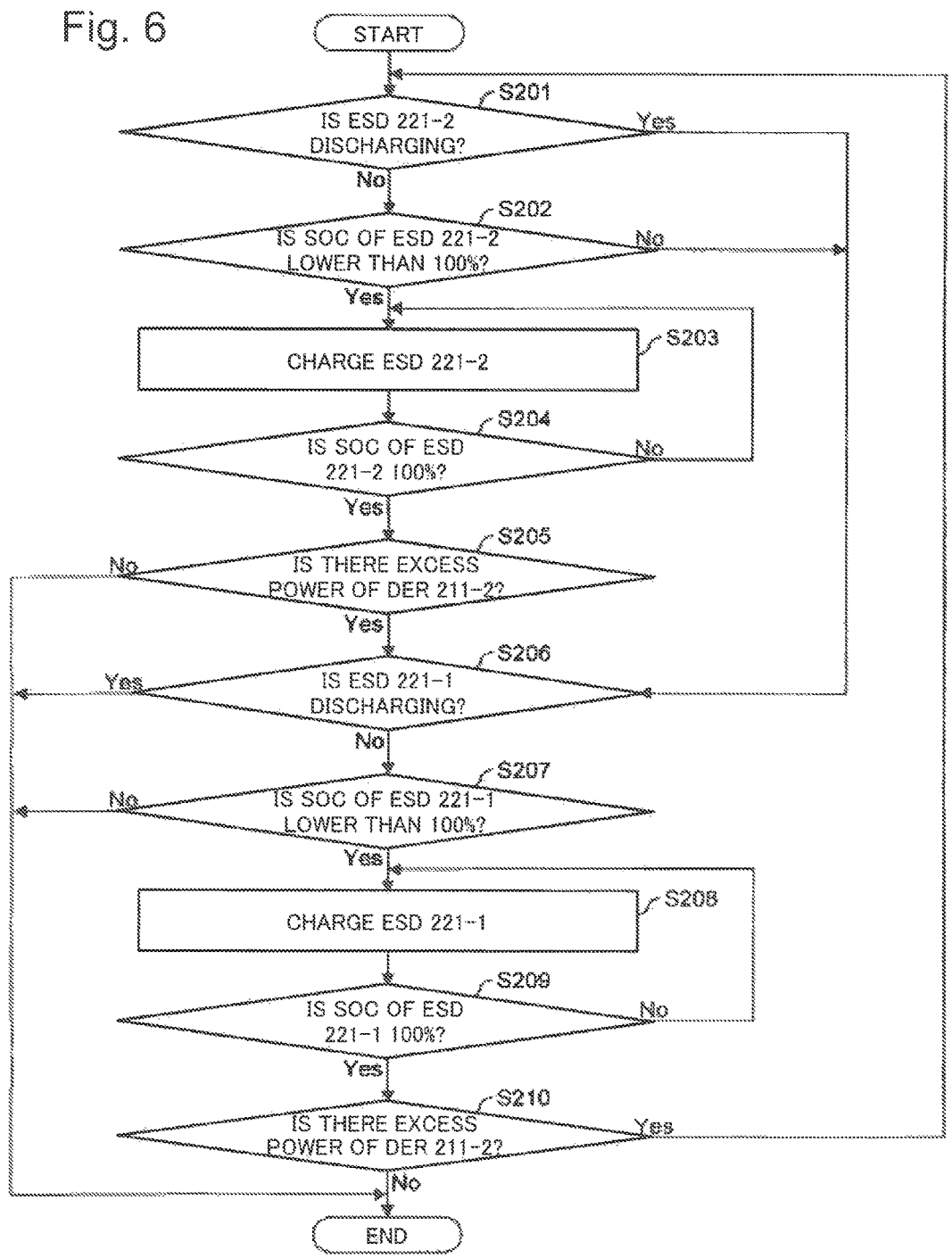
FIG. 6 is a flowchart presenting operations of the microgrid system illustrated in FIG. 4 performed to store excess power of a DER 211-2 in an ESD.

Next, operation performed when excess power of the DER 211-2 is to be stored in the ESDs 221 is described with reference to the flowchart presented in FIG. 6.

The control device 230 monitors the state of power supply and demand in the system and causes, when determining that there is excess power in an output by the DER 211-2, the ESDs 221 to store the excess power.

First, the control device 230 determines whether or not the ESD 221-2 corresponding to the DER 212-1 is discharging (Step S201).

When determining that the ESD 221-2 is not discharging (Step S201: No), the control device 230 determines whether or not the SOC indicating the charge level of the ESD 221-2 is lower than 100% (Step S202).

When determining that the SOC of the ESD 221-2 is lower than 100% (Step S202: Yes), the control device 230 causes the ESD 221-1 to store the excess power of the DER 211-2 (i.e., charges the ESD 221-1) (Step S203).

Subsequently, the control device 230 determines whether or not the SOC of the ESD 221-2 is 100% after, for example, a predetermined time period has elapsed (Step S204).

When determining that the SOC of the ESD 221-2 is not 100% (Step S204: No), the control device 230 returns to the operation in Step S203.

When determining that the SOC of the ESD 221-2 is 100% (Step S204: Yes), the control device 230 determines that the charging of the ESD 221-2 is completed and determines whether or not there is (still remains) excess power of the DER 211-2 (Step S205).

When determining that there is no excess power of the DER 211-2 (Step S205: No), the control device 230 terminates the process.

When determining that there is excess power of the DER 211-2 (Step S205: Yes), the control device 230 determines whether or not the ESD 221-1 is discharging (Step S206).

When determining that the ESD 221-1 is discharging (Step S206: Yes), the control device 230 terminates the process.

When determining that the ESD 221-1 is not discharging (Step S206: No), the control device 230 determines whether or not the SOC of the ESD 221-1 is lower than 100% (Step S207).

When determining that the SOC of the ESD 221-1 is not lower than 100%, i.e., determining that the SOC of the ESD 221-1 is 100% (Step S207: No), the control device 230 terminates the process.

When determining that the SOC of the ESD 221-1 is lower than 100% (Step S207: Yes), the control device 230 causes the ESD 221-1 to store the excess power of the DER 211-2 (i.e., charges the ESD 221-1) (Step S208).

Subsequently, the control device 230 determines whether or not the SOC of the ESD 221-1 is 100% after, for example, a predetermined time period has elapsed (Step S209).

When determining that the SOC of the ESD 221-1 is not 100% (Step S209: No), the control device 230 returns to the operation in Step S208.

When determining that the SOC of the ESD 221-1 is 100% (Step S209: Yes), the control device 230 determines that the charging of the ESD 221-1 is completed and determines whether or not there is (still remains) excess power of the DER 211-2 (Step S210).

When determining that there is no excess power of the DER 211-2 (Step S110: No), the control device 230 terminates the process.

When determining that there is excess power of the DER 211-2 (Step S110: Yes), the control device 230 returns to the operation in Step S201.

When determining that the ESD 221-2 is discharging (Step S101: Yes), the control device 230 advances to the operation in Step S206. When determining that the SOC of the ESD 221-2 is not lower than 100%, i.e., the SOC of the ESD 221-2 is 100% (Step S102: No), the control device 230 advances to the operation in Step S206.

As described above, when excess power of the DER 211-2 is to be stored in the ESDs 221, the control device 230 preferentially charges the ESD 221-2, which corresponds to the DER 211-2. The control device 230 charges the other ESD 221 when the ESD 221-2 is discharging, when the SOC of the ESD 221-2 is 100%, or when there is still excess power of the DER 211-2 after completion of charging of the ESD 221-2.

With this configuration, it is possible to store excess power of the DER 211-2 in the ESDs 221 without wasting the excess power.

Figure 7:
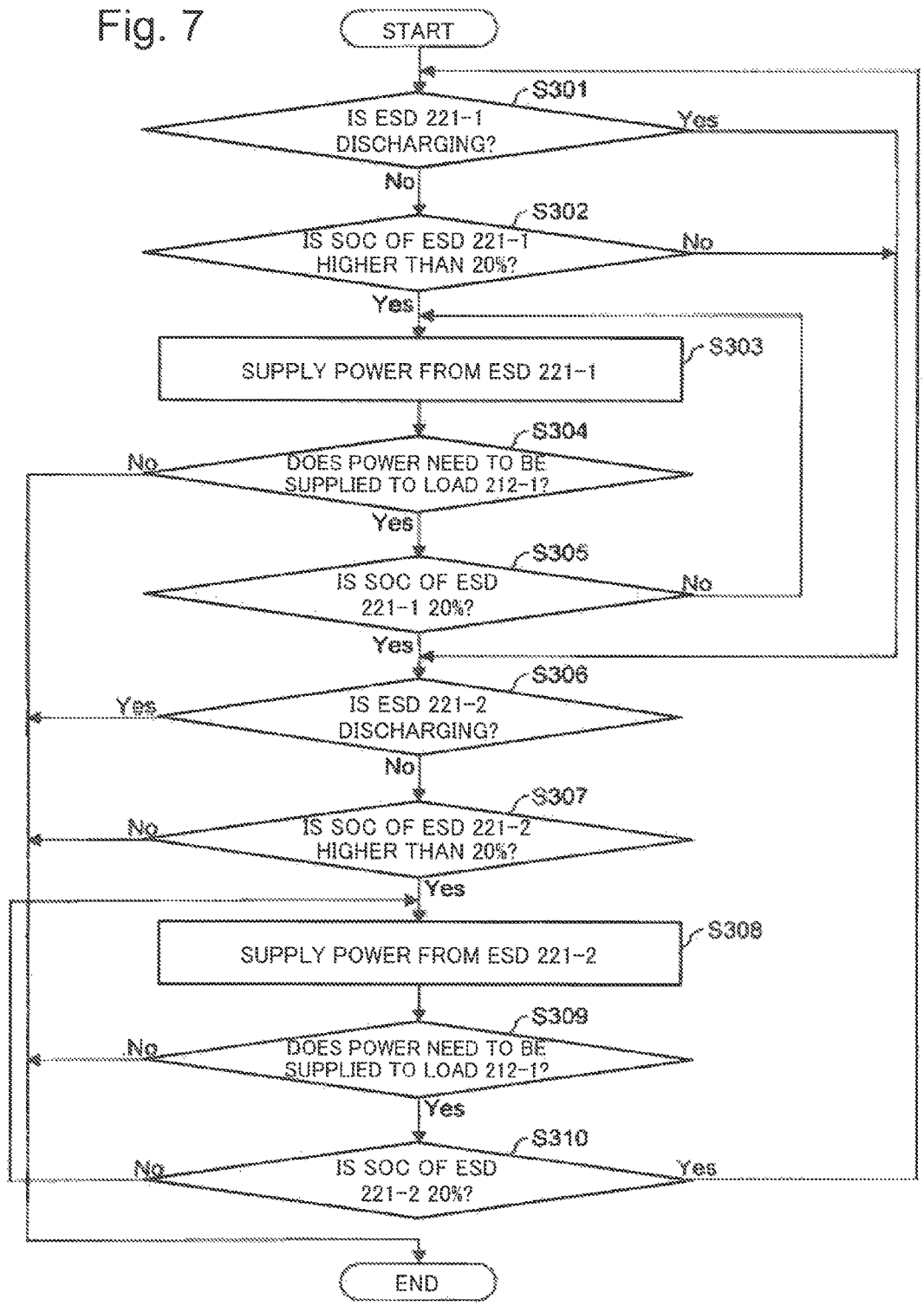
FIG. 7 is a flowchart presenting operations of the microgrid system illustrated in FIG. 4 performed to supply power to a LOAD 212-1.

Next, operation performed when power is supplied from the ESDs 221 to the LOAD 212-1 is described with reference to the flowchart presented in FIG. 7.

When power is to be supplied from the ESDs 221 to the LOAD 212-1, the control device 230, first, determines whether or not the ESD 221-1, which corresponds to the LOAD 212-1, is discharging (Step S301).

When determining that the ESD 221-1 is not discharging (Step S301: No), the control device 230 determines whether or not the SOC of the ESD 221-1 is higher than a predetermined threshold, e.g., 20% (Step S302). Note, as described above, that it is desirable to charge, when the SOC of any of the ESDs (storage batteries) 221 decreases to 20% or lower, the ESD 221 for the purpose of increasing the life of each of ESD 221. The predetermined threshold is set at a value of the SOC of the ESD (storage battery) 211 in a state where the ESD 221 is desired to be charged.

When determining that the SOC of the ESD 221-1 is higher than 20% (Step S302: Yes), the control device 230 causes the ESD 221-1 to supply power to the LOAD 212-1 (Step S303).

Subsequently, the control device 230 determines whether or not more power needs to be supplied to the LOAD 212-1, after, for example, a predetermined time period has elapsed (Step S304).

When determining that no more power needs to be supplied to the LOAD 212-1 (Step S304: No), the control device 230 terminates the process.

When determining that more power needs to be supplied to the LOAD 212-1 (Step S304: Yes), the control device 230 determines whether or not the SOC of the ESD 221-1 is 20% (Step S305).

When determining that the SOC of the ESD 221-1 is not 20% (Step S305: No), the control device 230 returns to the operation in Step S303.

When determining that the SOC of the ESD 221-1 is 20% (equal to or lower than 20%) (Step S305: Yes), the control device 230 determines whether or not the ESD 221-2 is discharging (Step S306).

When determining that the ESD 221-2 is discharging (Step S306: Yes), the ESD 221-2 is discharging power to the other LOAD 212, and hence the control device 230 terminates the process.

When determining that the ESD 221-2 is not discharging (Step S306: No), the control device 230 determines whether or not the SOC of the ESD 221-2 is higher than a predetermined threshold, e.g., 20% (Step S307).

When determining that the SOC of the ESD 221-2 is not higher than 20% (Step S307: No), the control device 230 terminates the process.

When determining that the SOC of the ESD 221-2 is higher than 20% (Step S307: Yes), the control device 230 causes the ESD 221-2 to supply power to the LOAD 212-1 (Step S308).

Subsequently, the control device 230 determines whether or not more power needs to be supplied to the LOAD 212-1, after, for example, a predetermined time period has elapsed (Step S309).

When determining that no more power needs to be supplied to the LOAD 212-1 (Step S309: No), the control device 230 terminates the process.

When determining that more power needs to be supplied to the LOAD 212-1 (Step S309: Yes), the control device 230 determines whether or not the SOC of the ESD 221-2 is 20% (Step S310).

When determining that the SOC of the ESD 221-2 is not 20% (Step S310: No), the control device 230 returns to the operation in Step S308.

When determining that the SOC of the ESD 221-2 is 20% (equal to or lower than 20%) (Step S310: Yes), the control device 230 returns to the operation in Step S301.

Meanwhile, when determining that the ESD 221-1 is discharging (Step S301: Yes) or when determining that the SOC of the ESD 221-1 is not higher than 20% (Step S302: No), the control device 230 advances to the operation in Step S306.

As described above, when the ESDs 221 are to supply power to the LOAD 212-1, the control device 230 preferentially causes the ESD 221-1, which corresponds to the LOAD 212-1, to supply power. In addition, the control device 230 causes the other ESD 221-1 to supply power to the LOAD 212-1 when the ESD 221-1 is discharging or when the SOC of the ESD 221-1 is not higher than 20%, while causing the other ESD 221 to supply power when the SOC of the ESD 221-1 decreases to 20% or lower.

With this configuration, it is possible to prevent a situation where any of the ESDs 221 in a low SOC supplies power to the LOAD 212-1 and to hence provide stable power supply to the LOAD 212-1. In addition, it is possible to prevent a situation where any of the ESDs 221 in a low SOC continues to supply power and to hence increase the life of each of the ESDs 221.

Figure 8:
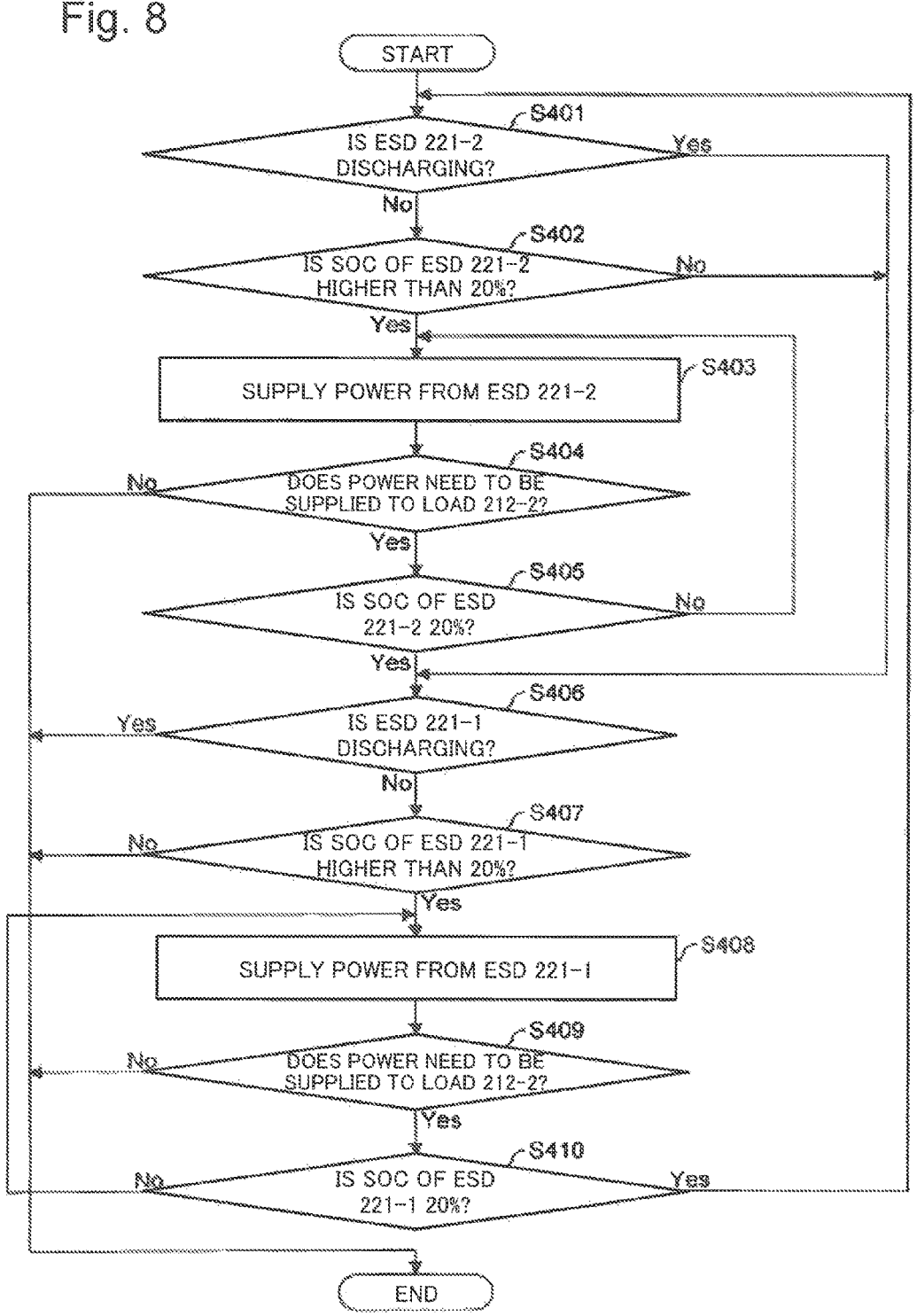
FIG. 8 is a flowchart presenting operations of the microgrid system illustrated in FIG. 4 performed to supply power to a LOAD 212-2.

Next, operation performed when power is supplied from the ESDs 221 to the LOAD 212-2 is described with reference to the flowchart presented in FIG. 8.

When power is to be supplied from the ESDs 221 to the LOAD 212-2, the control device 230, first, determines whether or not the ESD 221-2, which corresponds to the LOAD 212-2, is discharging (Step S401).

When determining that the ESD 221-2 is not discharging (Step S401: No), the control device 230 determines whether or not the SOC of the ESD 221-2 is higher than a predetermined threshold, e.g., 20% (Step S402).

When determining that the SOC of the ESD 221-2 is equal to or higher than 20% (Step S402: Yes), the control device 230 causes the ESD 221-2 to supply power to the LOAD 212-2 (Step S403).

Subsequently, the control device 230 determines whether or not more power needs to be supplied to the LOAD 212-2, after, for example, a predetermined time period has elapsed (Step S404).

When determining that no more power needs to be supplied to the LOAD 212-2 (Step S404: No), the control device 230 terminates the process.

When determining that more power needs to be supplied to the LOAD 212-2 (Step S404: Yes), the control device 230 determines whether or not the SOC of the ESD 221-2 is 20% (Step S305).

When determining that the SOC of the ESD 221-2 is not 20% (Step S405: No), the control device 230 returns to the operation in Step S403.

When determining that the SOC of the ESD 221-2 is 20% (equal to or lower than 20%) (Step S405: Yes), the control device 230 determines whether or not the ESD 221-1 is discharging (Step S406).

When determining that the ESD 221-1 is discharging (Step S406: Yes), the ESD 221-1 is discharging power to the other LOAD 212, and hence the control device 230 terminates the process.

When determining that the ESD 221-1 is not discharging (Step S406: No), the control device 230 determines whether or not the SOC of the ESD 221-1 is higher than a predetermined threshold, e.g., 20% (Step S407).

When determining that the SOC of the ESD 221-1 is not higher than 20% (Step S407: No), the control device 230 terminates the process.

When determining that the SOC of the ESD 221-1 is higher than 20% (Step S407: Yes), the control device 230 causes the ESD 221-1 to supply power to the LOAD 212-2 (Step S408).

Subsequently, the control device 230 determines whether or not more power needs to be supplied to the LOAD 212-2, after, for example, a predetermined time period has elapsed (Step S409).

When determining that no more power needs to be supplied to the LOAD 212-2 (Step S409: No), the control device 230 terminates the process.

When determining that more power needs to be supplied to the LOAD 212-2 (Step S409: Yes), the control device 230 determines whether or not the SOC of the ESD 221-1 is 20% (Step S310).

When determining that the SOC of the ESD 221-1 is not 20% (Step S410: No), the control device 230 returns to the operation in Step S408.

When determining that the SOC of the ESD 221-1 is 20% (equal to or lower than 20%) (Step S410: Yes), the control device 230 returns to the operation in Step S401.

Meanwhile, when determining that the ESD 221-2 is discharging (Step S401: Yes) or when determining that the SOC of the ESD 221-2 is not higher than 20% (Step S402: No), the control device 230 advances to the operation in Step S406.

As described above, when the ESDs 221 are to supply power to the LOAD 212-2, the control device 230 preferentially causes the ESD 221-2, which corresponds to the LOAD 212-2, to supply power. In addition, the control device 230 causes the ESD 221-2 to supply power to the LOAD 212-2 when the ESD 221-2 is discharging or when the SOC of the ESD 221-2 is not higher than 20%, while causing the other ESD 221 to supply power when the SOC of the ESD 221-2 decreases to 20% or lower.

With this configuration, it is possible to prevent a situation where any of the ESDs 221 in a low SOC supplies power to the LOAD 212-2 and to hence enable stable power supply to the LOAD 212-2. In addition, it is possible to prevent a situation where any of the ESDs 221 in a low SOC continues to supply power and to hence increase the life of each of the ESDs 221.

As described above, the microgrid system 200 of this exemplary embodiment includes the control device 230 that determines the ESD 221 to serve as a storage of power output by each of the DERs 211 and the ESD 221 to serve as a supplier of power to each of the LOADs 212, according to the states of the ESDs 221-1 and 221-2.

When excess power of one of the DERs 211 is to be stored in the ESDs 221, the control device 230 causes the ESD 221 corresponding to the DER 211 to store the power and causes, upon completion of the charging of the ESD 221, the other ESD 221 to store the power.

When power is supplied to one of the LOADs 212, the control device 230 causes the ESD 221 corresponding to the LOAD 212 to supply power to the LOAD 212 and causes, when the SOC of the ESD 221 decreases to a predetermined threshold or lower, the other ESD 221 to supply power to the LOAD 212.

With this configuration, when charging of the ESD 221 corresponding to the DER 211 is completed, power is stored in the other ESD 221, thus possibly reducing waste of power.

When the SOC of the ESD 221 supplying power to one of the LOADs 212 decreases, power is supplied to the LOAD 212 by the other ESD 221. This prevents a situation where the ESD 221 in a low SOC supplies power to the LOAD 212, and enables stable power supply to the LOAD 212. In addition, it is possible to prevent a situation where any of the ESDs 221 in a low SOC continues to supply power and to hence possibly increase the life of each of the ESDs 221.

Further, by providing the plurality of ESDs 221, it is possible to reduce the cost per unit storage capacity and to hence limit an increase in cost, in comparison with a case of providing a single ESD having a large storage capacity.

Note that, although this exemplary embodiment has been described by using the example in which the microgrid system 200 includes two sub-microgrid systems 210 and the shared unit 220 includes two ESDs 221, the microgrid system 200 is not limited to this. The microgrid system 200 may include three or more sub-microgrids 210, and the shared unit 220 may include the same number of ESDs 221 as that of the sub-microgrids 210.

Third Exemplary Embodiment

Figure 9:
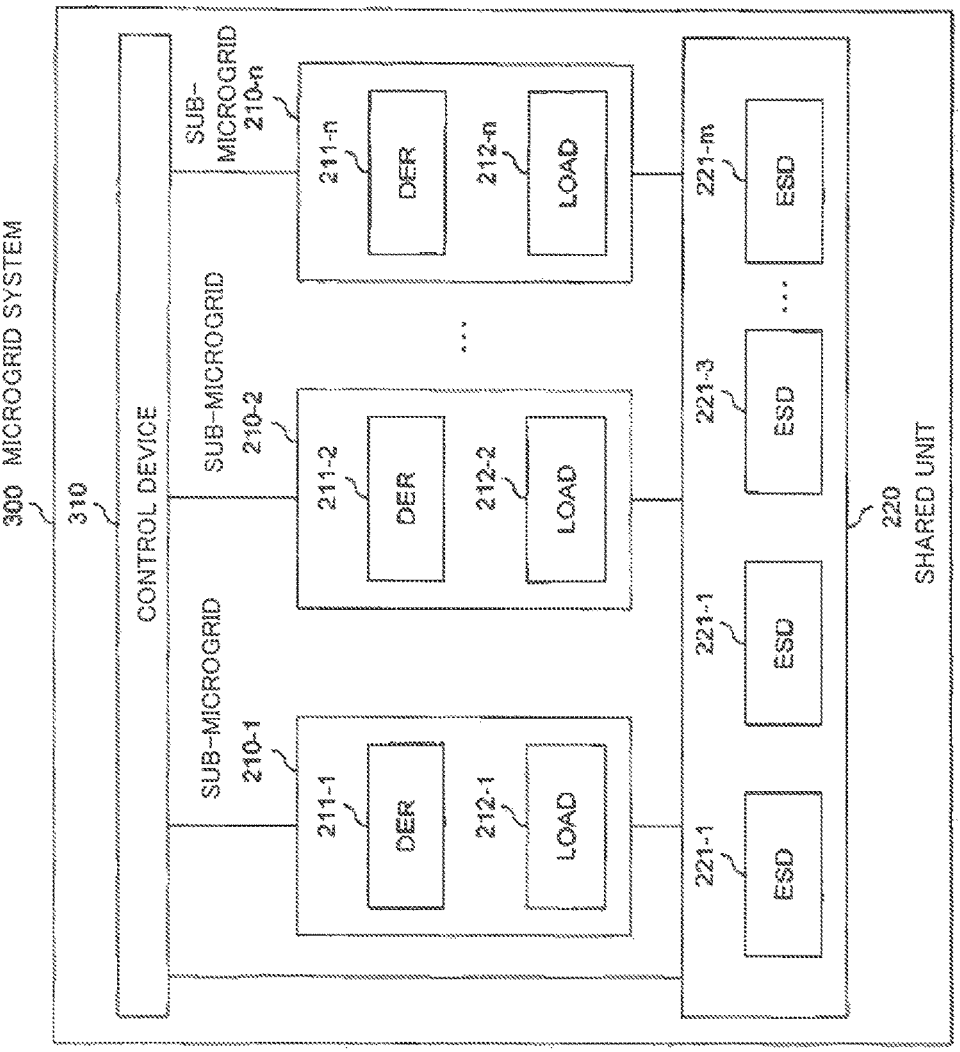
FIG. 9 is a diagram illustrating a configuration of main part of a microgrid system of a third exemplary embodiment of the present invention.

FIG. 9 is a diagram illustrating a configuration of main part of a microgrid system 300 of a third exemplary embodiment of the present invention. Note that, in FIG. 9, similar components to those in FIG. 4 are denoted by the same reference signs as those in FIG. 4, and description thereof is omitted.

The microgrid system 300 illustrated in FIG. 9 includes n sub-microgrids 210 (210-1 to 210-n), a shared unit 220, which is connected to each of the sub-microgrids 210 and includes m ESDs 221 (221-1 to 221-m), and a control device 310. Note that each of n and m is an integer equal to or larger than two.

The control device 310 controls the DER 211-1 to the DER 211-n and the ESDs 221-1 to 221-m.

Next, operation of the microgrid system 300 is described.

Figure 10:
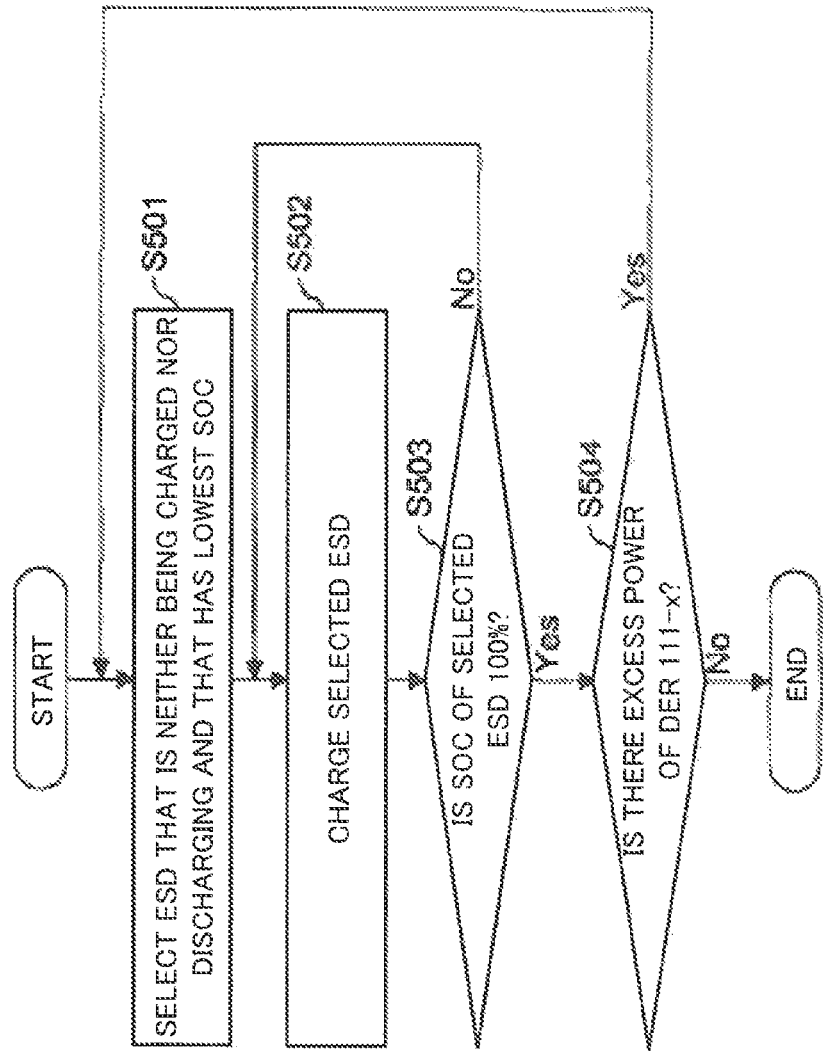
FIG. 10 is a flowchart presenting operations of the microgrid system illustrated in FIG. 9 performed to store excess power of a DER in an ESD.

First, operation performed when excess power of any DER 211 (DER 211-x) among the DER 211-1 to the DER 211-n is to be stored in the ESDs 221 is described with reference to the flowchart presented in FIG. 10.

The control device 310 monitors the state of power supply and demand in the system and causes, when determining that there is excess power in an output by the DER 211-x, the ESDs 221 to store the excess power.

First, the control device 310 selects the ESD 221 that is neither being charged nor discharging and that has the lowest SOC, from among the ESDs 221-1 to 221-m (Step S501).

Subsequently, the control device 310 causes the selected ESD 221 to store the excess power of the DER 211-x (i.e., charges the selected ESD 221) (Step S502).

Subsequently, the control device 310 determines whether or not the SOC of the selected ESD 221 is 100% after, for example, a predetermined time period has elapsed (Step S503).

When determining that the SOC of the selected ESD 221 is not 100% (Step S503: No), the control device 310 returns to the operation in Step S502.

When determining that the SOC of the selected ESD 221 is 100% (Step S503: Yes), the control device 310 determines whether or not there is (still remains) excess power of the DER 211-x (Step S504).

When determining that there is no excess power of the DER 211-x (Step S504: No), the control device 310 terminates the process.

When determining that there is excess power of the DER 211-x (Step S504: Yes), the control device 310 returns to the operation in Step S501.

As described above, when excess power of one of the DERs 211 is to be stored in the ESDs 221, the control device 310 sequentially charges the ESDs 221 from the ESD 221 that is neither being charged nor discharging and that has the lower SOC, until there remains no excess power. With this configuration, it is possible to store excess power of the DER 211 in the ESDs 221 without wasting the excess power.

Figure 11:
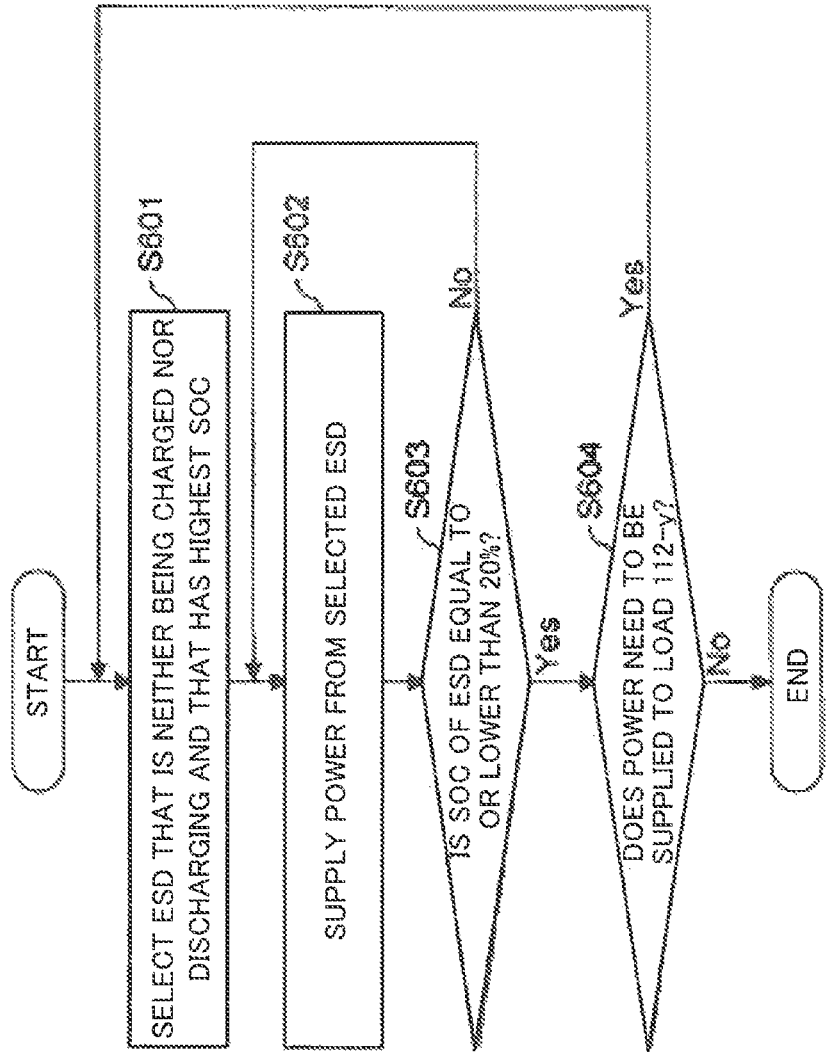
FIG. 11 is a flowchart presenting operations of the microgrid system illustrated in FIG. 9 performed to supply power to a LOAD.

Next, operation performed when power is to be supplied from the ESDs 221 to any LOAD 212 (LOAD 212-y) among the LOADs 212-1 to 212-m is described with reference to the flowchart presented in FIG. 11.

When power is to be supplied from the ESDs 221 to the LOAD 212-y, the control device 310, first, selects the ESD 221 that is neither being charged nor discharging and that has the highest SOC, from among the ESDs 221-1 to 221-m (Step S601).

Subsequently, the control device 310 causes the selected ESD 221 to supply power to the LOAD 212-y (Step S602).

Subsequently, the control device 310 determines whether or not the SOC of the selected ESD 221 is equal to or lower than 20%, after, for example, a predetermined time period has elapsed (Step S603).

When determining that the SOC of the selected ESD 221 is not equal to or lower than 20% (Step S603: No), the control device 310 returns to the operation in Step S602.

When determining that the SOC of the selected ESD 221 is equal to or lower than 20% (Step S603: Yes), the control device 310 determines whether or not more power needs to be supplied to the LOAD 212-y (Step S604).

When determining that no more power needs to be supplied to the LOAD 212-y (Step S604: No), the control device 310 terminates the process.

When determining that more power needs to be supplied to the LOAD 212-y (Step S604: Yes), the control device 310 returns to the operation in Step S601.

As described above, when power is to be supplied from the ESDs 221 to one of the LOADs 212, the control device 310 sequentially causes the ESDs 221 to supply power to the LOAD 212 from the ESDs 221 that is neither being charged nor discharging and has the higher SOC, until the SOC of the ESD 221 decreases to the predetermined threshold or lower.

With this configuration, it is possible to prevent a situation where any of the ESDs 221 in a low SOC supplies power to each of the LOADs 212 and to hence provide stable power supply to the LOADs 212. In addition, it is possible to prevent a situation where any of the ESDs 221 in a low SOC continues to supply power and to hence possibly increase the life of each of the ESDs 221.

As described above, the microgrid system 300 of this exemplary embodiment includes the control device 310 that determines the ESD 221 to serve as a storage of power output by each of the DERs 211-1 to 211-n and the ESD 221 to serve as a supplier of power to each of the LOADs 212, according to the states of the ESDs 221-1 to 221-m.

When excess power of one of the DERs 211 is to be stored in the ESDs 221, the control device 310 sequentially causes the ESDs 221 to store the power from the ESD 221 having the lower SOC and causes, upon completion of the charging of the ESD 221, one of the other ESDs 221 to store the power.

Further, when power is to be supplied to one of the LOADs 212, the control device 230 sequentially causes the ESDs 221 to supply power, starting with the ESD 221 having the higher SOC until the SOC of the ESD 221 decreases to the predetermined threshold or lower.

With this configuration, when charging of the ESD 221 corresponding to the DER 211 is completed, power is stored in one of the other ESDs 221, thus reducing waste of power.

Further, when the SOC of the ESD 221 supplying power to each of the LOADs 212 decreases, one of the other ESDs 221 supplies power to the LOAD 212. This prevents a situation where any of the ESDs 221 in a low SOC supplies power to the LOAD 212, and enables stable power supply to the LOAD 212. In addition, it is possible to prevent a situation where any of the ESDs 221 in a low SOC continues to supply power and to hence possibly increase the life of each of the ESDs 221.

Further, by providing the plurality of ESDs 221, it is possible to reduce the cost per unit storage capacity and to hence limit an increase in cost, in comparison with a case of providing a single ESD having a large storage capacity.

The method performed in the microgrid system according to the present invention may be implemented as a program to be executed by a computer. In addition, the program can be stored in a storage medium and can be provided to the outside via a network.

Part or the whole of the above-described exemplary embodiments may be described as, but not limited to, the following supplementary notes.

(Supplementary Note 1)

A microgrid system including:

a plurality of sub-microgrids each of which includes a power generator that outputs power and a customer that consumes power;

a shared unit that is connected to each of the plurality of sub-microgrids and that includes a plurality of energy storage devices for storing power; and a control device that determines, when power output by any of the power generators is to be stored in the energy storage devices, an energy storage device to serve as a storage of the power output by the power generator, according to states of the plurality of respective energy storage devices, and that determines, when power is to be supplied to any of the customers, an energy storage device to serve as a supplier of the power to the customer, according to states of the plurality of respective energy storage devices.

(Supplementary Note 2)

The microgrid system according to Supplementary Note 1, wherein the energy storage devices are provided so as to correspond to the plurality of respective sub-microgrids, and, when power of any of the power generators is to be stored, the control device causes the energy storage device corresponding to the sub-microgrid including the power generator, to store the power of the power generator, and causes, upon completion of charging of the energy storage device, a different one of the energy storage devices to store the power of the power generator.

(Supplementary Note 3)

The microgrid system according to Supplementary Note 2, wherein, when power of any of the power generators is to be stored, the control device causes the energy storage device corresponding to the sub-microgrid including the power generator, to store the power of the power generator when the energy storage device is not discharging, and causes, when the energy storage device is discharging, a different one of the energy storage devices to store the power of the power generator.

(Supplementary Note 4)

The microgrid system according to Supplementary Note 2 or 3, wherein, when power is to be supplied to any of the customers, the control device causes the energy storage device corresponding to the sub-microgrid including the customer, to supply power to the customer, and causes, when a charge level of the energy storage device decreases to a predetermined threshold or lower, a different one of the energy storage devices to supply power to the customer.

(Supplementary Note 5)

The microgrid system according to Supplementary Note 4, wherein, when power is to be supplied to any of the customers, the control device causes the energy storage device corresponding to the sub-microgrid including the customer, to supply power to the customer when the energy storage device is not discharging, and causes, when the energy storage device is discharging, a different one of the energy storage devices to supply power to the customer.

(Supplementary Note 6)

The microgrid system according to Supplementary Note 1, wherein, when power output by any of the power generators is to be stored in the energy storage devices, the control device sequentially causes the energy storage devices to store the power of the power generator, from an energy storage device that is neither being charged nor discharging and that has a lower charge level among the plurality of energy storage devices.

(Supplementary Note 7)

The microgrid system according to Supplementary Note 6, wherein, when power is to be supplied to any of the customers, the control device sequentially causes the energy storage devices to supply power to the customer, from an energy storage device that is neither being charged nor discharging and that has a higher charge level among the plurality of energy storage devices.

(Supplementary Note 8)

A method of controlling a microgrid system including power generators that output power, the microgrid system being provided with a plurality of sub-microgrids each of which includes a power generator that outputs power and a customer that consumes power, and a shared unit that is connected to each of the plurality of sub-microgrids and that includes a plurality of energy storage devices for storing power, the control method including:

determining, when power output by any of the power generators is to be stored, an energy storage device to serve as a storage of the power output by the power generator, according to states of the plurality of respective energy storage devices; and determining, when power is to be supplied to any of the customers, an energy storage device to serve as a supplier of the power to the customer, according to states of the plurality of respective energy storage devices.

(Supplementary Note 9)

The control method according to Supplementary Note 8, wherein the energy storage devices are provided so as to correspond to the plurality of respective sub-microgrids, and, when power of any of the power generators is to be stored, the energy storage device corresponding to the sub-microgrid including the power generator is caused to store the power of the power generator, and upon completion of charging of the energy storage device, a different one of the energy storage devices is caused to store the power of the power generator.

(Supplementary Note 10)

The control method according to Supplementary Note 9, wherein, when power of any of the power generators is to be stored, the energy storage device corresponding to the sub-microgrid including the power generator is caused to store the power of the power generator when the energy storage device is not discharging, and when the energy storage device is discharging, a different one of the energy storage devices is caused to store the power of the power generator.

(Supplementary Note 11)

The control method according to Supplementary Note 9 or 10, wherein, when power is to be supplied to any of the customers, the energy storage device corresponding to the sub-microgrid including the customer is caused to supply power to the customer, and when a charge level of the energy storage device decreases to a predetermined threshold or lower, a different one of the energy storage devices is caused to supply power to the customer.

(Supplementary Note 12)

The control method according to Supplementary Note 11, wherein, when power is to be supplied to any of the customers, the energy storage device corresponding to the sub-microgrid including the customer is caused to supply power to the customer when the energy storage device is not discharging, and when the energy storage device is discharging, a different one of the energy storage devices is caused to supply power to the customer.

(Supplementary Note 13)

The control method according to Supplementary Note 8, wherein, when power output by any of the power generators is to be stored in the energy storage devices, the energy storage devices are sequentially caused to store the power of the power generator, from an energy storage device that is neither being charged nor discharging and that has a lower charge level among the plurality of energy storage devices.

(Supplementary Note 14)

The control method according to Supplementary Note 13, wherein, when power is to be supplied to any of the customers, the energy storage devices are sequentially caused to supply power to the customer, from an energy storage device that is neither being charged nor discharging and that has a higher charge level among the plurality of energy storage devices.

The invention of the present application has been described above with reference to the exemplary embodiments. However, the invention of the present invention is not limited to the above-described exemplary embodiments. Various changes understood by those skilled in the art can be made to the configuration and details of the invention of the present application within the scope of the invention of the present application.

This application is based upon and claims the benefit of priority from Japanese Patent Application No. 2014-035061, filed on Feb. 26, 2014, the disclosure of which is incorporated herein in its entirety by reference.

REFERENCE SIGNS LIST 100, 200 Microgrid system
110, 210 Sub-microgrid
111 Power generator
112 Customer
120, 220 Shared unit
121 Energy storage device
130, 230, 310 Control device
211 DER
212 LOAD
221 ESD

The invention claimed is:

1. A microgrid system comprising:
a plurality of sub-microgrids each of which includes a power generator that outputs power and a customer that consumes power;
a shared unit that is connected to each of the plurality of sub-microgrids and that includes a plurality of energy storage devices for storing power; and
a control device that determines, when power output by any of the power generators is to be stored in the energy storage devices, an energy storage device to serve as a storage of the power output by the power generator, according to states of the plurality of respective energy storage devices, and that determines, when power is to be supplied to any of the customers, an energy storage device to serve as a supplier of the power to the customer, according to states of the plurality of respective energy storage devices;
wherein the plurality of energy storage devices is provided so as to correspond to the plurality of respective sub-microgrids; and
wherein, when power of any of the power generators is to be stored, the control device causes the energy storage device corresponding to the plurality of sub-microgrids, to store the power of the power generator when the energy storage device is not discharging, and causes, when the energy storage device is discharging, a different one of the plurality of energy storage devices to store the power of the power generator.

2. The microgrid system according to claim 1, wherein when power of any of the power generators is to be stored, the control device causes the energy storage device corresponding to the sub-microgrid, to store the power of the power generator, and causes, upon completion of charging of the energy storage device, a different one of the plurality of energy storage devices to store the power of the power generator.

3. The microgrid system according to claim 2, wherein, when power is to be supplied to any of the customers, the control device causes the energy storage device corresponding to the sub-microgrid, to supply power to the customer, and causes, when a charge level of the energy storage device decreases to a predetermined threshold or lower, a different one of the plurality of energy storage devices to supply power to the customer.

4. The microgrid system according to claim 3, wherein, when power is to be supplied to any of the customers, the control device causes the energy storage device corresponding to the sub-microgrid, to supply power to the customer when the energy storage device is not discharging, and causes, when the energy storage device is discharging, a different one of the plurality of energy storage devices to supply power to the customer.

5. The microgrid system according to claim 1, wherein, when power output by any of the power generators is to be stored in the energy storage devices, the control device sequentially causes the energy storage devices to store the power of the power generator, from an energy storage device that is neither being charged nor discharging and that has a lower charge level among the plurality of energy storage devices.

6. The microgrid system according to claim 5, wherein, when power is to be supplied to any of the customers, the control device sequentially causes the energy storage devices to supply power to the customer, from an energy storage device that is neither being charged nor discharging and that has a higher charge level among the plurality of energy storage devices.

7. A method of controlling a microgrid system including power generators that output power,
the microgrid system being provided with a plurality of sub-microgrids each of which includes a power generator that outputs power and a customer that consumes power, and a shared unit that is connected to each of the plurality of sub-microgrids and that includes a plurality of energy storage devices for storing power, wherein the plurality of energy storage devices is provided so as to correspond to the plurality of respective sub-microgrids,
the control method comprising:
determining, when power output by any of the power generators is to be stored, an energy storage device to serve as a storage of the power output by the power generator, according to states of the plurality of respective energy storage devices;
causing the energy storage device corresponding to the plurality of sub-microgrids, to store the power of the power generator when the energy storage device is not discharging, and when the energy storage device is discharging, causing a different one of the plurality of energy storage devices to store the power of the power generator; and
determining, when power is to be supplied to any of the customers, an energy storage device to serve as a supplier of the power to the customer, according to states of the plurality of respective energy storage devices.

8. The control method according to claim 7, wherein when power of any of the power generators is to be stored, the energy storage device corresponding to the sub-microgrid is caused to store the power of the power generator, and upon completion of charging of the energy storage device, a different one of the plurality of energy storage devices is caused to store the power of the power generator.

9. The control method according to claim 8, wherein, when power is to be supplied to any of the customers, the energy storage device corresponding to the sub-microgrid is caused to supply power to the customer, and when a charge level of the energy storage device decreases to a predetermined threshold or lower, a different one of the plurality of energy storage devices is caused to supply power to the customer.

10. The control method according to claim 9, wherein, when power is to be supplied to any of the customers, the energy storage device corresponding to the sub-microgrid is caused to supply power to the customer when the energy storage device is not discharging, and when the energy storage device is discharging, a different one of the plurality of energy storage devices is caused to supply power to the customer.

11. The control method according to claim 7, wherein, when power output by any of the power generators is to be stored in the energy storage devices, the energy storage devices are sequentially caused to store the power of the power generator, from an energy storage device that is neither being charged nor discharging and that has a lower charge level among the plurality of energy storage devices.

12. The control method according to claim 11, wherein, when power is to be supplied to any of the customers, the energy storage devices are sequentially caused to supply power to the customer, from an energy storage device that is neither being charged nor discharging and that has a higher charge level among the plurality of energy storage devices.

13. A microgrid system comprising:
a plurality of sub-microgrids each of which includes a power generator that outputs power and a customer that consumes power;
a shared unit that is connected to each of the plurality of sub-microgrids and that includes a plurality of energy storage devices for storing power;
a control device that determines, when power output by any of the power generators is to be stored in the energy storage devices, an energy storage device to serve as a storage of the power output by the power generator, according to states of the plurality of respective energy storage devices, and that determines, when power is to be supplied to any of the customers, an energy storage device to serve as a supplier of the power to the customer, according to states of the plurality of respective energy storage devices;
wherein the plurality of energy storage devices is provided so as to correspond to the plurality of respective sub-microgrids; and
wherein, when power is to be supplied to any of the customers, the control device causes the energy storage device corresponding to the sub-microgrid, to supply power to the customer when the energy storage device is not discharging, and causes, when the energy storage device is discharging, a different one of the plurality of energy storage devices to supply power to the customer.

14. A method of controlling a microgrid system including power generators that output power,
the microgrid system being provided with a plurality of sub-microgrids each of which includes a power generator that outputs power and a customer that consumes power, and a shared unit that is connected to each of the plurality of sub-microgrids and that includes a plurality of energy storage devices for storing power, wherein the plurality of energy storage devices is provided so as to correspond to the plurality of respective sub-microgrids,
the control method comprising:
determining, when power output by any of the power generators is to be stored, an energy storage device to serve as a storage of the power output by the power generator, according to states of the plurality of respective energy storage devices;
determining, when power is to be supplied to any of the customers, an energy storage device to serve as a supplier of the power to the customer, according to states of the plurality of respective energy storage devices; and
causing the energy storage device corresponding to the sub-microgrid, to supply power to the customer when the energy storage device is not discharging, and when the energy storage device is discharging, causing a different one of the plurality of energy storage devices to supply power to the customer.

\* \* \* \* \*